United States Patent [19]
Wolff et al.

[11] Patent Number: 5,445,448
[45] Date of Patent: Aug. 29, 1995

[54] ELECTROMAGNETICALLY ACTUATABLE VALVE

[75] Inventors: Guenter Wolff, Schwieberdingen; Klaus Mueller, Tamm; Norbert Alaze, Markgroeningen; Michael Friedow, Tamm; Juergen Gruber, Frickenhausen, all of Germany

[73] Assignee: Robert Bosch GmbH, Stuttgart, Germany

[21] Appl. No.: 293,272

[22] Filed: Aug. 19, 1994

[30] Foreign Application Priority Data

Sep. 8, 1993 [DE] Germany .................. 43 30 325.0

[51] Int. Cl.6 .................. B60T 8/36; F16K 31/06
[52] U.S. Cl. .................. 303/119.2; 303/900; 303/901
[58] Field of Search .................. 303/119.1, 119.2, 900, 303/901, 116.1, 116.2, 113.2, 113.3; 137/596.17; 251/129.15

[56] References Cited

U.S. PATENT DOCUMENTS 5,267,785 12/1993 Maisch .................. 303/901 X
5,335,984 8/1994 Alaze et al. .................. 303/900 X

FOREIGN PATENT DOCUMENTS 4030963 4/1992 Germany .
4202389 8/1993 Germany .

*Primary Examiner*—Douglas C. Butler
*Attorney, Agent, or Firm*—Edwin E. Greigg; Ronald E. Greigg

[57] ABSTRACT

A known electromagnetically actuatable valve has a tubular housing sleeve, a through opening radially penetrating the housing sleeve, and inside the housing sleeve, a valve body having a valve seat and an associated movable valve closing member, and a throttle, which comprises a throttle body and a throttle insert built into it having a throttle restriction, which is embodied as a throttle bore. The throttle body is slipped on like a cap over an open end of the housing sleeve. The throttle of this kind, embodied in a complex manner, is expensive and demands an inordinate amount of installation space. To reduce expense and save installation space, the throttle body along with its throttle insert is omitted and the function of the throttle bore is taken on by the through opening, the through opening is embodied as narrow opening in accordance with the throttle function to be produced. The valve can be used in antilock devices of hydraulic brake systems for motor vehicles.

5 Claims, 2 Drawing Sheets

ELECTROMAGNETICALLY ACTUATABLE VALVE

BACKGROUND OF THE INVENTION

The invention is based on an electromagnetically actuatable valve particularly for a hydraulic antilock brake system used especially for motor vehicles, as generically defined hereinafter.

German Patent Disclosure DE 40 30 963 A1 makes known an electromagnetically actuatable valve that has a throttle restriction, which has a valve seat body, with a valve seat, as well as a valve closing member that can be moved in relation to the valve seat. In this electromagnetically actuatable valve, the setting of the armature stroke can only be carried out with difficulty, since a throttle disk having a very small throttle bore, which constitutes the throttle restriction, hinders the use of a measuring tool having a tracer pin, which must be introduced through a flow bore of the valve seat body in order to engage the valve closing member.

German Patent Disclosure DE 42 02 389 A1 makes known a further valve with a throttle especially for use in an antilock device of a hydraulic brake system for motor vehicles. Here, the throttle comprises at least one throttle body and, aligned with its longitudinal axis, a throttle restriction, which is embodied as a throttle bore. The throttle body has a section provided with a cylindrical recess, with which it can fit like a cap over an outlet side end of a housing sleeve of the valve. The throttle body is expensive and demands an inordinate amount of installation space.

OBJECT AND SUMMARY OF THE INVENTION

The valve has the advantage of not requiring an expensive, slip-on throttle body as in the prior art, as a result of the transferral of the throttle function to the already existing through opening and therefore upon installation, it reduces the demand for installation space. This leads to a reduction in price and weight, for example of antilock devices for hydraulic motor vehicle brake systems.

The provisions of the dependent claims indicate how to achieve the effect of a through opening which takes over the function of a throttle that until now was manufactured separately.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
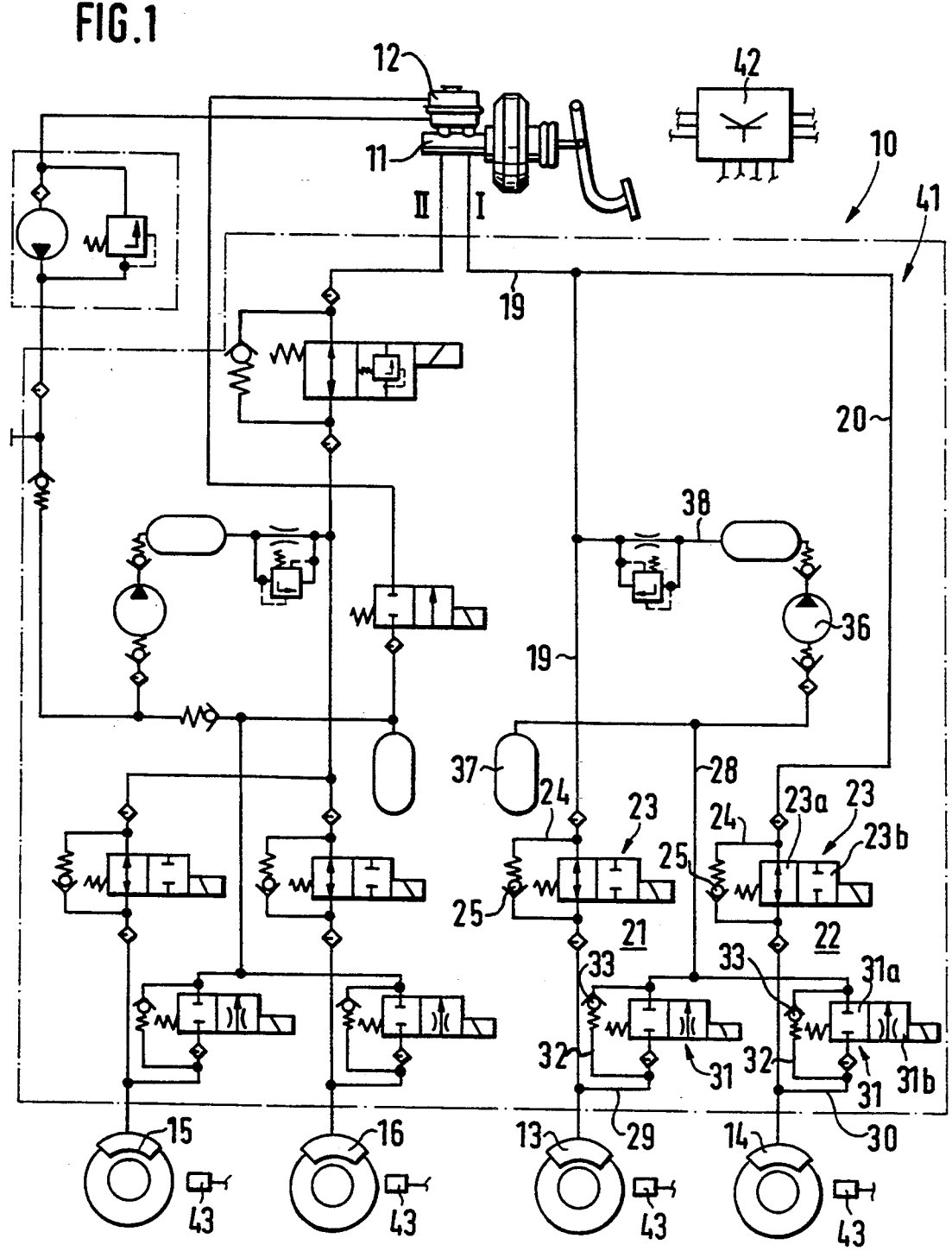
FIG. 1 shows a wiring diagram of a hydraulic brake system having electromagnetically actuatable valves.

An antilock hydraulic brake system 10 for motor vehicles, shown by way of example in FIG. 1, has a pedal-actuated master cylinder 11, with a pressure fluid reservoir 12. A first brake circuit I is for example associated with brake cylinders 13, 14 of the non-driven wheels, for example the front wheels of the vehicle. Brake cylinders 15, 16 of the drive wheels, for example the rear wheels of the vehicle are connected to a second brake circuit II, for example. The brake system 10 consequently has a so-called TT brake circuit split. Brake circuit I is further explained below:

The first brake circuit I has a first brake line 19 leading from the master cylinder 11 to the brake cylinder 13. From this brake line 19, a second brake line 20 branches to the brake cylinder 14 of this brake circuit I. One valve device 21 and 22, respectively, is associated with each of the brake cylinders 13, 14, for brake pressure modulation. The valve devices 21, 22 each have an intake valve 23 disposed in the corresponding brake line 19, 20. This is embodied as an electromagnetically actuatable 2/2-way valve having a spring-actuated open position 23a and an electromagnetically switchable closed position 23b. Parallel to each intake valve 23, a bypass line 24 is provided in which a check valve 25 is disposed. Each check valve 25 has an opening direction from the corresponding brake cylinder 13, 14 to the master cylinder 11 and makes possible a return flow of the pressure fluid in the event that the pressure on the brake cylinder side exceeds the pressure on the master cylinder side by a, characteristic pressure value of the check valve 25.

A branched return line 28 leads from the associated brake lines 19, 20 between each intake valve 23 and the brake cylinders 13, 14. An outlet valve 31 of the valve devices 21, 22 for brake pressure modulation is disposed in each return line branch 29 or 30. The outlet valves 31 are embodied as electromagnetically actuatable 2/2-way valves. They have a spring-actuated closed position 31a and as electromagnetically switchable open position 31b, functioning as a throttle. During operation of the antilock device, the throttle function slows down the pressure decrease in the brake cylinders 13, 14, so that the quality of control by the antilock device is improved. A variation of the throttle function of the outlet valves 31 in their open position 31b makes possible an adaptation to a required pressure decrease gradient in the brake cylinders 13, 14. Parallel to the outlet valves 31 a check valve 33 is disposed in each bypass line 32, having an opening direction toward each brake cylinder 13, 14.

The return line 28 leads to the suction side of a high pressure pump 36. Between the suction side of the high pressure pump 36 and the outlet valves 31 of the valve devices 21, 22, a storage chamber 37 is connected to the return line 28, so as to receive the pressure fluid withdrawn from the brake cylinders 13, 14. On the pressure side, a feed line 38 for pressure fluid leads from the high pressure pump 36; this feed line is connected to the first brake line 19 between the valve device 21 and the master cylinder 11.

The hydraulic brake system 10 elements disposed between the master cylinder 11 and the brake cylinders 13-16 are part of an antilock and drive slip regulator or traction control device 41. This device 41 includes an electronic control unit 42 and also the wheel speed sensors 43 associated with the individual vehicle wheels. The control unit 42 can analyze signals from the wheel speed sensors 43 and can convert them into switching signals for the electric subassemblies of the brake system 10. Antilock operation is possible in the non-driven wheels of the vehicle in brake circuit I, and both antilock and traction control operation are possible in the driven wheels of the vehicle in brake circuit II, not described.

Figure 2:
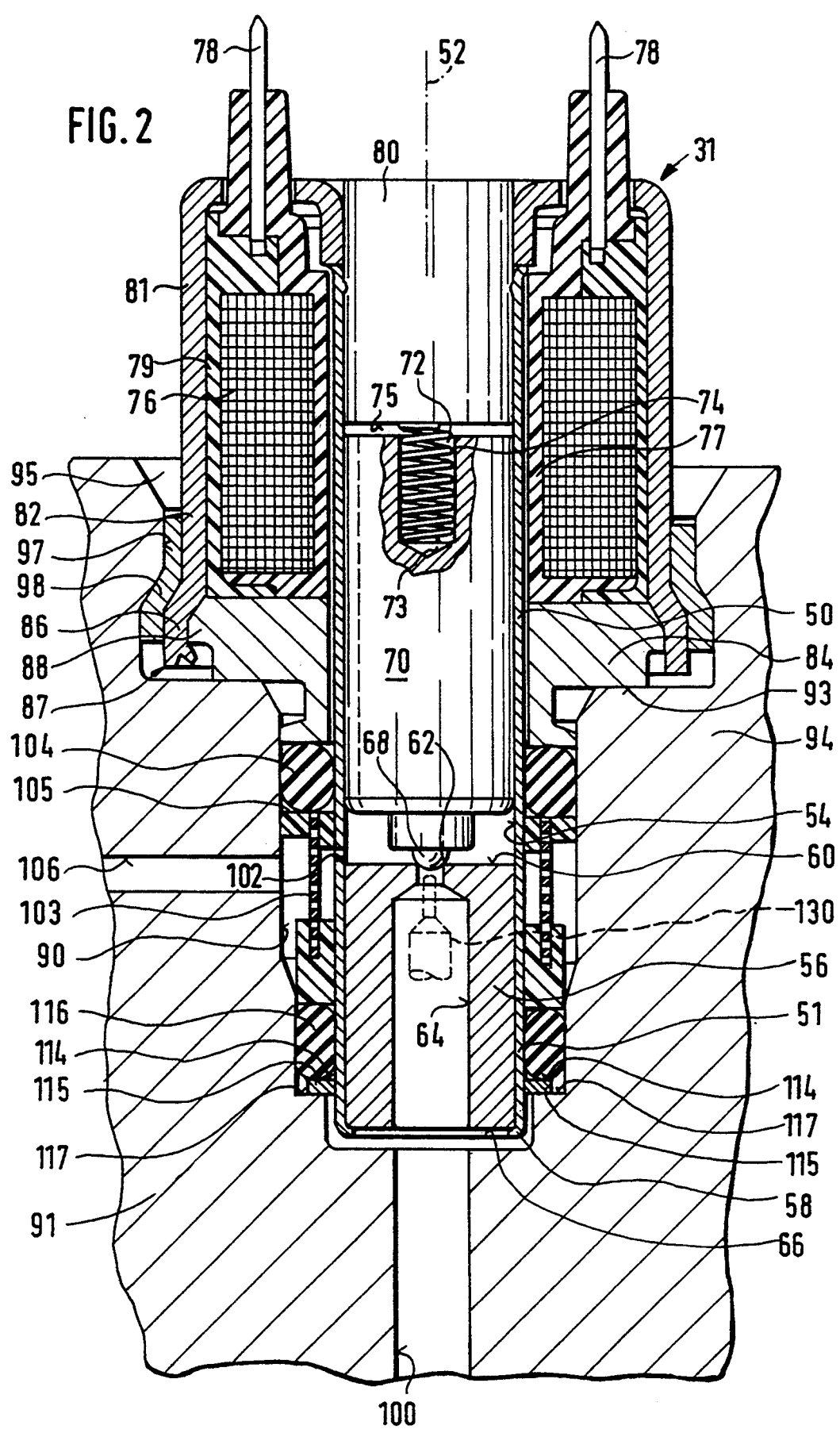
FIG. 2 shows a longitudinal section through such a valve according to the invention.

FIG. 2 shows an electromagnetically actuatable outlet valve 31 of the valve devices 21, 22 for brake pressure modulation in the respective brake cylinder 13, 14. The outlet valve 31 has a pipe-like, elongated housing sleeve 50 having a longitudinal bore 54 running concentric to a longitudinal axis 52 of the valve. On the one end 51 of the housing sleeve 50 there is a housing part, designated as a valve seat body 56, that is thrust axially for example all the way into the longitudinal bore 54. The valve seat body 56 is pressed for example into the longitudinal bore 54 of the housing sleeve 50 and held in place axially by means of a radially inward-flanged retaining edge 58 embodied on the end 51 of the housing sleeve 50. On its end remote from the retaining edge 58, the valve seat body 56, which for example is tubular, has an upper face end 60 that has a fixed valve seat 62 for example concentric to the longitudinal axis 52 of the valve. A continuous, stepped flow bore 64 leads from the fixed valve seat 62 and extends in the valve seat body 56 concentric to the longitudinal axis 52 of the valve; this flow bore 64 connects the valve seat 62 on the upper face end 60 to a lower face end 66 of the valve seat part 56 remote from the upper face end 60, and makes possible a flow of pressure fluid from the valve seat 62 to the lower face end 66 or in the reverse direction. A valve closing member 68, which for example is ball-shaped and is joined directly to a cylindrical armature 70, cooperates with the fixed valve seat 62 of the tubular valve seat body 56. The valve seat 62 and the valve closing member 68 form a seat valve. The armature 70 is supported so that it slides in the longitudinal bore 54 of the elongated housing sleeve 50.

The armature 70, on its end remote from the valve seat body 56, has a blind bore 72 that extends for example concentric to the longitudinal axis 52 of the valve, in which bore a restoring spring 74 is disposed. On its one end, the restoring spring 74 is supported on a base 73 of the blind bore 72 and on its other end is supported on a lower face end 75 of an interior pole 80, which at least partially protrudes into the longitudinal bore 54 on the end of the housing sleeve 50 remote from the valve seat body 56. The restoring spring 74 strives to move the armature 70 having the valve closing member 68 toward the fixed valve seat 62 and thus to close the seat valve. The armature 70 and the interior pole 80 are at least partially encompassed axially by a magnet coil 76. The magnet coil 76 has a coil body 77 having electrical connection plugs 78 as well as an extruded plastic coil coating 79. A cup-shaped housing jacket 81 completely encompasses the magnet coil 76, axially, for example, with a cylinder part 82, and partially encompasses a housing flange part 84 disposed adjacent to the magnet coil 76 toward the valve seat body 56. The cup-shaped housing jacket 81, on its lower end 86 oriented toward the valve seat part 56, is connected for example by means of a flange joint 87 to a radially outward-facing connecting flange 88 of the housing flange part 84; the housing jacket 81 has an enlarged diameter on its end 86.

The outlet valve 31 is disposed for example in a receiving bore 90 of a valve recess 91, of a valve block or a hydraulic unit, for example; the housing jacket 81 having the electrical connecting plugs 78 protrudes axially at least partially out from the receiving bore 90. With a contact face end 93 of the housing flange part 84 oriented toward the valve seat body 56, the outlet valve 31 contacts a retaining shoulder 94 of the stepped receiving bore 90.

On an upper end 95, from which the outlet valve 31 protrudes axially out of the valve recess 91, the receiving bore 90 has a radially inward-pointing diameter reduction 97. Beginning at this upper end 95, a retaining ring 98 is squeezed into the receiving bore 90 radially between the cylinder part 82 of the housing jacket 81 and the wall of the receiving bore 90, which retaining ring 98 extends in the direction of the longitudinal axis 52 of the valve at least in the region of the diameter reduction 97 of the receiving bore 90 and in the region of the lower end 86 of the housing jacket 81, that has an enlarged diameter; this retaining ring 98 forms a frictional and positive connection between the outlet valve 31 and the receiving bore 90 of the valve recess 91.

On its end remote from the diameter reduction 97, the stepped receiving bore 90 has a flow section 100, which communicates with the flow bore 64 of the valve seat body 56 and forms a section of a return line branch 29, 30 on the master cylinder side. A through opening 102 axially penetrates the wall of the housing sleeve 50 in the region between the housing flange part 84 and the valve seat body 56. On the circumference of the housing sleeve 50 a ring-shaped filter element 103 is disposed which covers the through opening 102 with a filter sieve and which serves to filter the pressure fluid. On the circumference of the housing sleeve 50, an upper sealing ring 104 is disposed axially between the housing flange part 84 and an upper face end 105 of the filter element 103 oriented toward the housing flange part 84, which sealing ring 104 sealingly contacts the circumference of the housing sleeve 50 and the wall of the receiving bore 90.

A flow conduit 106 is embodied in the valve recess 91, running for example perpendicular to the longitudinal axis 52 of the valve; in the region of the through opening 102 of the housing sleeve 50, it communicates with the receiving bore 90 of the valve recess 91, forms a section of the return line branch 29 or 30 on the brake cylinder side, and serves to supply pressure fluid to the outlet valve 31 on the brake cylinder side.

On the circumference of the housing sleeve 50, axially between the filter element 103 and the upper face end 114 of a support ring 115, a lower sealing ring 116 is disposed, which is axially supported on the upper face end 114 and which sealingly contacts the circumference of the housing sleeve 50 and the wall of the receiving bore 90 of the valve recess 91. The support ring 115 for the lower sealing ring 116 is axially fixed by a step 117 of the receiving bore 90.

According to the invention, the housing sleeve 50 and the through opening 102 made in it form a throttle. The through opening 102 can be embodied for example as a throttle bore having a diameter of a few tenths of a millimeter, for example 0.3 mm. To produce the through opening 102 that acts as a throttle, a punching die can also be used, in lieu of a rotating drill. The through bore that acts as a throttle can alternatively also be produced by a laser beam or formed by means of chemical and/or electrical erosion.

The stroke of the valve closing member 68 and hence of the armature 70 is set by means of a length-measuring tool. For this purpose, before the installation of the outlet valve 31 in the receiving bore 90 of the valve recess 91, a graduated tracer pin 130 is inserted from below into the flow bore 64 of the valve seat body 56 and made to engage the valve closing member 68. The armature stroke is now set by means of moving the interior pole 80 in the longitudinal bore 54 of the housing sleeve 50 along the longitudinal axis 52 of the valve. Finally, the interior pole 80 is connected to the housing sleeve 50 for example by means of a weld. The now fully assembled and preset outlet valve 31 is now slid into the receiving bore 90 of the valve recess 91. Thus it becomes possible in a simple manner to set the armature stroke on the end of the outlet valve 31 remote from the magnet coil 76.

In brake pressure modulation, during which in pressure decrease phases, the outlet valve 31 is switched in its open position 31*b* and therefore the valve closing member 68 is lifted from its valve seat 62, pressure fluid flows by means of the flow conduit 106 of the valve recess 91 and the through opening 102 into the longitudinal bore 54 of the housing sleeve 50, flows from there through the valve seat 62 and through the flow bore 64 of the valve seat body 56, overcoming the throttle function generated by the through opening 102, into the flow section 100 of the receiving bore 90 to the high pressure pump 36 or to the storage chamber 37. The sealing rings 104, 116 prevent the pressure fluid from escaping out of the receiving bore 90 of the valve recess 91 and bypassing the through opening 102, which functions as a throttle. When the outlet valve 31 is open and the through opening 102 allows a through flow and functions as a throttle, pressures prevail within and downstream of the housing sleeve 50 that are lower than the effective pressure between the sealing rings 104 and 116. Thus the retaining ring 98 is put at least intermittently under less stress than the one in the outlet valve having an axially mounted throttle, which was the point of departure for the invention.

When the outlet valve 31 is in its closed position 31*a*, the pressure fluid cannot flow through it. The check valve 33 disposed in the bypass line 32 makes it possible for the pressure fluid, upon surmounting a characteristic, preset opening pressure of the check valve 33, to flow in the reverse direction, that is from the high pressure pump 36 or the storage chamber 37 toward the brake cylinders 13, 14.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable valve in combination with a throttle opening for an antilock-equipped hydraulic brake system for motor vehicles, said electromagnetically actuatable valve having a tubular housing sleeve (50); a valve seat body (56) disposed in said tubular housing sleeve, said valve seat body including a fixed valve seat (62) concentric with said valve seat body, a continuous, unrestricted, stepped flow opening extends from said valve seat to a lower end face (66) of said valve seat body with a small diameter portion extending to said valve seat and a greater diameter portion extending to said lower end of said valve seat body; a valve closing member (68) which is movable relative to the valve seat, an armature (70) and a magnet coil (76) which actuates said valve closing member; at least one sealing ring that encompasses the housing sleeve, and, adjoining the sealing ring, a single small area, in cross section, radial through opening (102) is made in the housing sleeve, in which the housing sleeve (50) and said small area radial through opening (102) are embodied as said throttle opening, and said throttle opening has a smaller area in cross section than that of said small diameter portion of said flow opening that extends to said valve seat.

2. A valve according to claim 1, in which the through opening (102) is drilled as a round hole.

3. A valve according to claim 1, in which the through opening (102) is punched out.

4. A valve according to claim 1, in which the through opening (102) is produced by a laser beam.

5. A valve according to claim 1, in which the through opening (102) is produced by means of erosion.

* * * * *